Figures 1, 2:
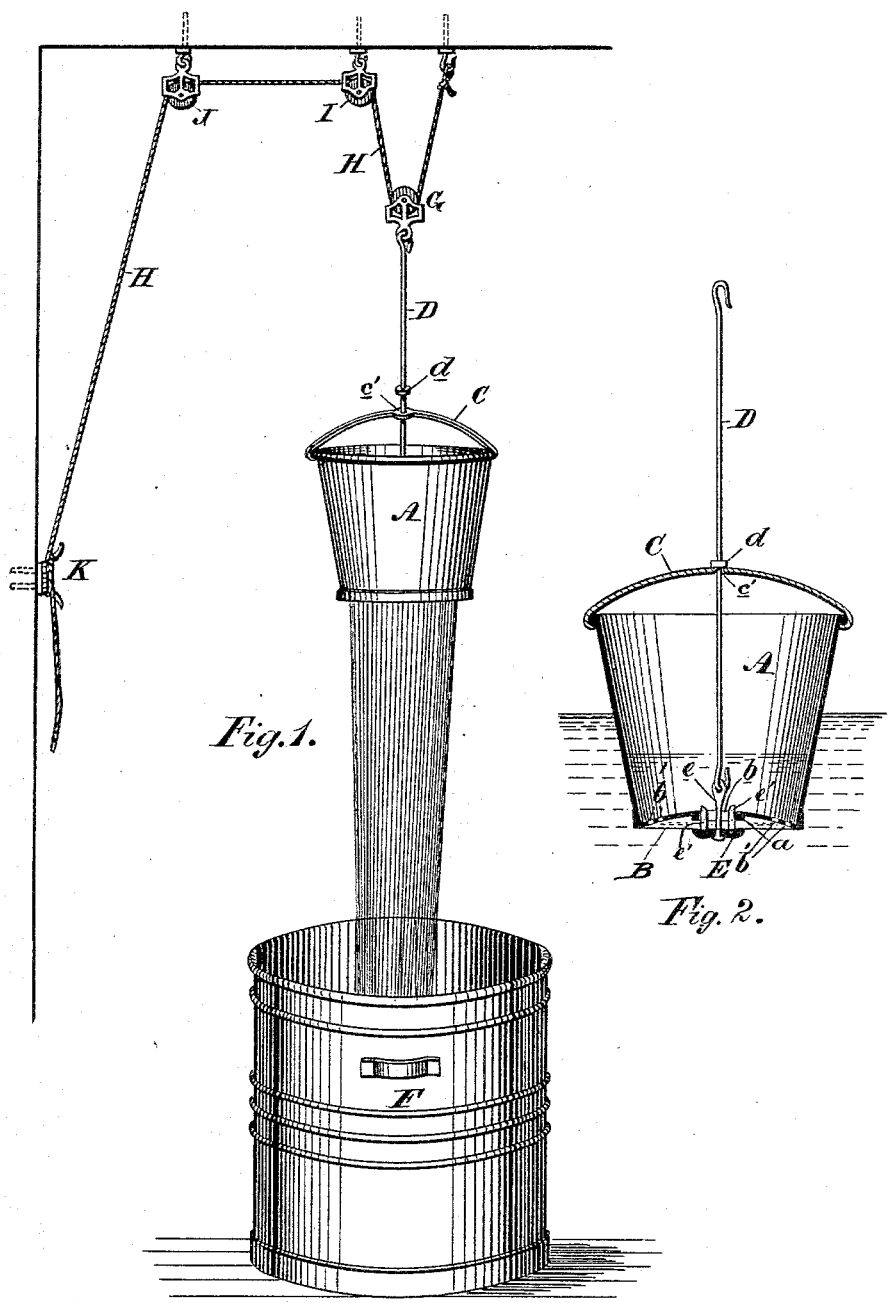

(No Model.)

P. W. STRONG.
MILK AERATOR.

No. 411,694. Patented Sept. 24, 1889.

Witnesses:
John Grist
Wm. L. Magee

Inventor:
P. W. Strong
By Henry Grist
Attorney.

UNITED STATES PATENT OFFICE.

PITT W. STRONG, OF BROCKVILLE, ASSIGNOR OF ONE-HALF TO OGLE CARSS, OF SMITH'S FALLS, ONTARIO, CANADA.

MILK-AERATOR.

SPECIFICATION forming part of Letters Patent No. 411,694, dated September 24, 1889.

Application filed April 3, 1889. Serial No. 305,905. (No model.)

*To all whom it may concern:*

Be it known that I, PITT W. STRONG, of Brockville, in the Province of Ontario, in the Dominion of Canada, have invented certain new and useful Improvements in Milk-Aerators; and I do hereby declare that the following is a full, clear, and exact description of the same, reference being had to the accompanying drawings, in which—

Figure 1 is an elevation of my improved aerator and accessory devices as when in use and operation, and Fig. 2 is a vertical section of the said aerator detached and enlarged and buoyant in the milk to be aerated.

My invention has for its object to facilitate the aeration of milk by contact with the atmosphere to thoroughly cool and deodorize it previous to delivery at the factory by depressing a perforated and valved-bottom pail into a can of milk and then lifting the pail to a suitable height, whereby the milk will return in fine streams to the can from whence it was taken.

My invention consists of a pail having a perforated bottom and a port therein, and a valve-rod passing loosely through a bar across the top of the pail and through said port, and connecting with a valve outside the bottom of the pail, so that the valve-rod falls a limited distance when the pail is floated in the can of milk to be aereated to open the port, whereby the pail will fill, and the port will be closed by the upward movement of the valve-rod when lifting the pail to suspend it, whereby the milk will flow through the perforated bottom and fall into the can.

A is a pail or vessel having a perforated bottom B, preferably two concentric rows of holes $b'$ near the circumference, and a central port $b$, and provided at the top diametrically with a guide-bar C, having a hole $C'$ at the middle.

D is a rod inserted through the hole $C'$ and port $b$, and provided with a stop projection $d$ above bar C to limit the rise of the pail upwardly on the rod.

E is a valve below the bottom of the pail, and said valve has guide projections $e'$ inclosed by the wall of port $b$ in the bottom of the pail. The valve E has a stem $e$, provided with an eye, to which the lower end of rod D is connected, and said pail is guided in its rise and fall on the rod by the hole $C'$ in the cross-bar C, and the projections $e'$ of the valve having frictional contact with the wall of the port, whereby the valve-seat $a$ on the bottom of the pail will be kept true on valve E to close the port.

F is a can to contain the milk to be treated, and in which can the milk is carried to the factory.

When the pail is lowered empty into the can of milk to be aerated, the pail will float, and the valve-rod then falls until arrested by stop $d$, bearing on bar C. The valve-rod in falling permits the valve to open port $b'$, thus allowing the pail to fill, and when filled the port will again be closed when the pail is lifted by the valve-rod and suspended to allow escape of the milk through the perforations only in fine streams into the can. The operation of filling and emptying the pail, as described, is repeated until the milk is divested of animal-heat and thoroughly deodorized.

For the purpose of conveniently lowering and lifting the pail the upper end of the suspending-rod D is provided with a pulley G, and one end of a rope H is fastened to a hook or other fastening secured to the ceiling and passing under the sheave of pulley G, and thence over other pulleys I J, suitably located, and the loose end of the rope belayed to a cleat K, secured to a fixture.

I claim as my invention—

An aerator-vessel comprising a pail A, having a perforated bottom provided with a central port $b'$, and a bar C across the top, a rod D, passing loosely through said bar and port and provided with a suspending-pulley G and stop $d$, and a valve E, connected to the lower end of said rod below the bottom of the pail, whereby the port is opened by the downward movement of the rod when the pail is afloat and closed when the pail is lifted by the rod for its suspension, as set forth.

PITT W. STRONG.

Witnesses:
JOHN GRIST,
WM. L. MAGEE.